(12) United States Patent
Rambo

(10) Patent No.: US 7,568,873 B1
(45) Date of Patent: Aug. 4, 2009

(54) WRENCHLESS NUT DEVICE

(76) Inventor: Ross W. Rambo, 1916 32nd St. South, Great Falls, MT (US) 59405

(*) Notice: Subject to any disclaimer, the term of this patent is extended or adjusted under 35 U.S.C. 154(b) by 309 days.

(21) Appl. No.: 11/396,460

(22) Filed: Apr. 3, 2006

(51) Int. Cl.
*F16B 37/08* (2006.01)

(52) U.S. Cl. .................................. 411/433; 411/432

(58) Field of Classification Search ......... 411/432–434, 411/437; 285/34; 403/322.4
See application file for complete search history.

(56) References Cited

U.S. PATENT DOCUMENTS

| | | | |
|---|---|---|---|
| 3,709,088 A | 1/1973 | Pitzer | |
| 4,281,857 A * | 8/1981 | Randall | 285/34 |
| 4,556,352 A * | 12/1985 | Resnicow | 411/433 |
| 4,802,804 A * | 2/1989 | Hirohata | 411/433 |
| 5,598,994 A * | 2/1997 | Olewinski et al. | 248/73 |
| 6,004,064 A | 12/1999 | Franz | |
| 6,293,450 B1 | 9/2001 | Aron | |
| 6,851,905 B2 * | 2/2005 | Manfred | 411/286 |

* cited by examiner

*Primary Examiner*—Gary Estremsky

(57) ABSTRACT

A detachable fixing device for engaging a bolt comprises a nut and a lever pivotally attached to the nut. The lever is provided with two lugs, whereas the nut comprises two articulated, threaded and spring-biased bolt grips. In a home position of the lever, the grips are moved apart to allow the loose slipping of the nut onto the bolt. In an active position of the lever, the grips are pressed on by the lugs, whereby the bolt grips engage the bolt with the thread.

2 Claims, 3 Drawing Sheets

WRENCHLESS NUT DEVICE

FIELD OF THE INVENTION

The present invention relates to fasteners in general, and particularly to quick-release clamp-type mechanisms. Even more particularly, the invention relates to a nut device that does not require a wrench to grip a bolt.

BACKGROUND OF THE INVENTION

Known from U.S. Pat. No. 3,709,088 for Quick Acting, High Tensile, Blind Fastener (issued on 9 Jan. 1973 to Kenneth H. Pitzer) is a structure where rotation of a cam brings a first cam surface to bear on the driving side of a sheet and forces the head of a drawbolt to expand the fingers of an expansible sleeve radially outward for subsequent engagement of the blind side of another sheet. Continued rotation of the cam brings a second cam surface into engagement with the driving side of the sheet to draw the expanded sleeve against the blind side, clamp the sheets together, and form a joint.

U.S. Pat. No. 6,004,064 issued on 21 Dec. 1999 to Patrick J. Franz for Retrofittable Quick Release Mechanism discloses a quick release mechanism, which has a lifting ring and a support ring and generally surrounds a shaft to be clamped. A cam or other lifting mechanism, operated by a handle, acts to separate the support ring and the lifting ring in a direction in line with the shaft. A restraint and adjustment nut mounted on the end of the shaft in contact with the lifting ring acts to tension the shaft. The lifting mechanism is free to rotate about the shaft independently of the restraint and adjusting nut allowing the handle to be used in any orientation desired and preventing the handle from being used as a crank or wrench. Embodiments are provided allowing retrofit to existing shaft fastening applications, including those where access to the interior of the shaft must be maintained.

Known from a U.S. Pat. No. 6,293,450 for Quick Release Mechanism For Motorcycle Saddlebag (issued on 25 Sep. 2001 to Mathew R. Aron) discloses a quick-release mounting system for a motorcycle saddlebag and a method for retrofitting a motorcycle with the system. The system includes two or more couplings, with which one can retrofit a motorcycle by replacing each bolt of the original mounting system with one of the couplings. Each coupling includes a first coupling portion and a second coupling portion that can be removably coupled and uncoupled with one another in a quick-release manner.

A need exists for a nut that can eliminate the need of being threaded onto a bolt.

It is another object of the present invention to provide a nut with an integral tightening mechanism.

SUMMARY OF THE INVENTION

According to the present invention, there is provided a nut with an integral tightening mechanism defined as a detachable bolt mate that comprises a nut and a lever pivotally attached to the nut. The nut is made with a hole that is variable in size, whereby the nut is adapted to slip loosely onto the bolt and to tightly embrace the bolt when acted upon by the lever. The lever is provided with two lugs, and the nut comprises two articulated, threaded and spring-biased bolt grips. In a home position of the lever the bolt grips pivotally move apart, to allow the nut to loosely slip onto the bolt. In an active position of the lever, its lugs press on the bolt grips, and the bolt grips engage the bolt with the thread.

These features make the wrenchless nut device of the present invention easy and convenient in use.

BRIEF DESCRIPTION OF DRAWINGS

Other objects, features and advantages of the invention will become apparent to one skilled in the art by reading the following specification and subjoined claims and by referencing the following drawings, in which:

DETAILED DESCRIPTION

Figure 1:
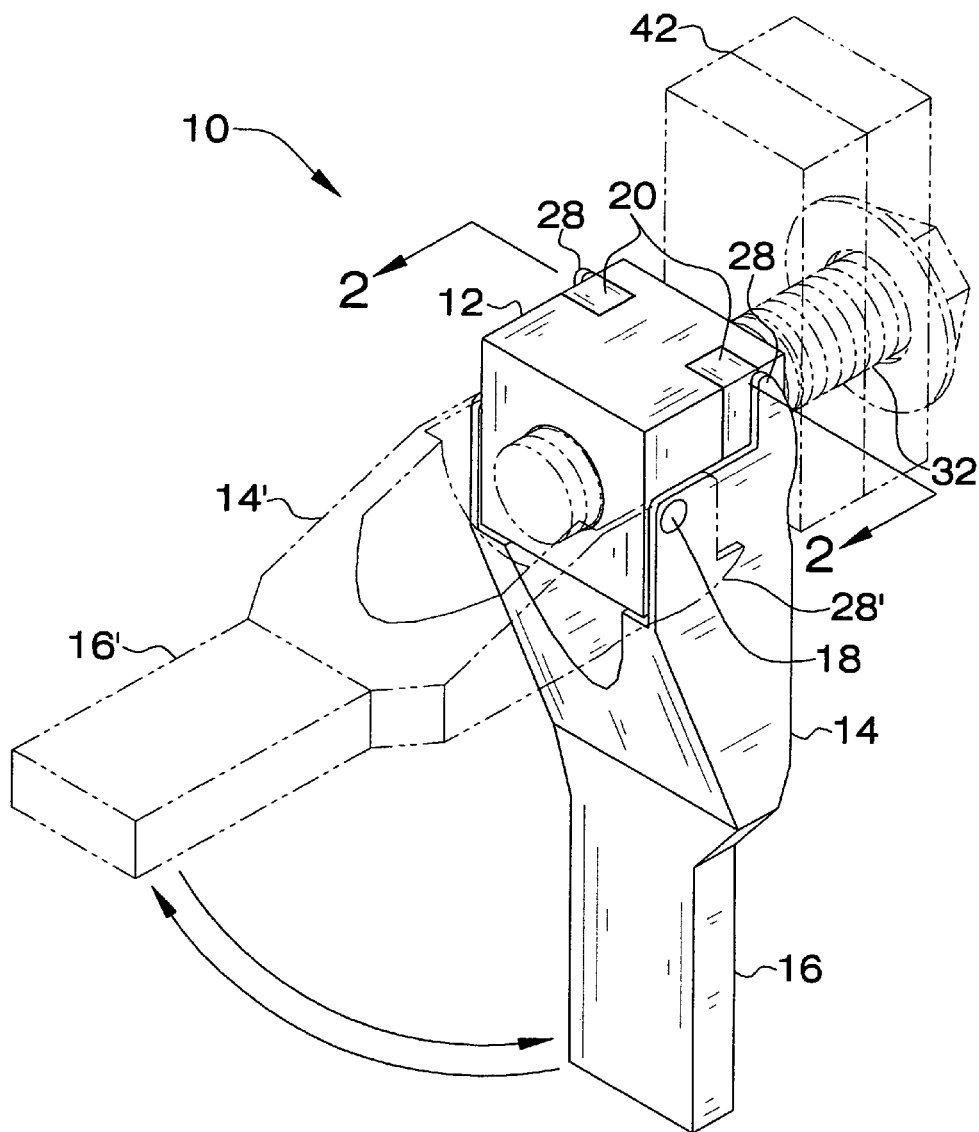
FIG. 1 is a perspective view of a detachable bolt mate in accordance with the present invention shown it its active position to bolt pieces of material.

Referring now to FIGS. 1-4, a wrenchless nut (or a detachable bolt mate as it can also be defined) 10 (FIG. 1) comprises a nut 12 and a lever 14 equipped with a handle 16. The lever 14 is attached to the nut 12 by a lever hinge 18 and thus is adapted to pivot by at least 90° around the nut 12. The nut 12 is made with two bolt grips 20. The bolt grips 20 are attached to the nut 12 from the opposite sides thereof, and are made articulate around axes in the plane of the drawing of FIG. 2. On their ends opposite to those with axes 22, the bolt grips 20 are biased by springs 24 with regard to a top end 26 of the nut 12.

Figure 2:
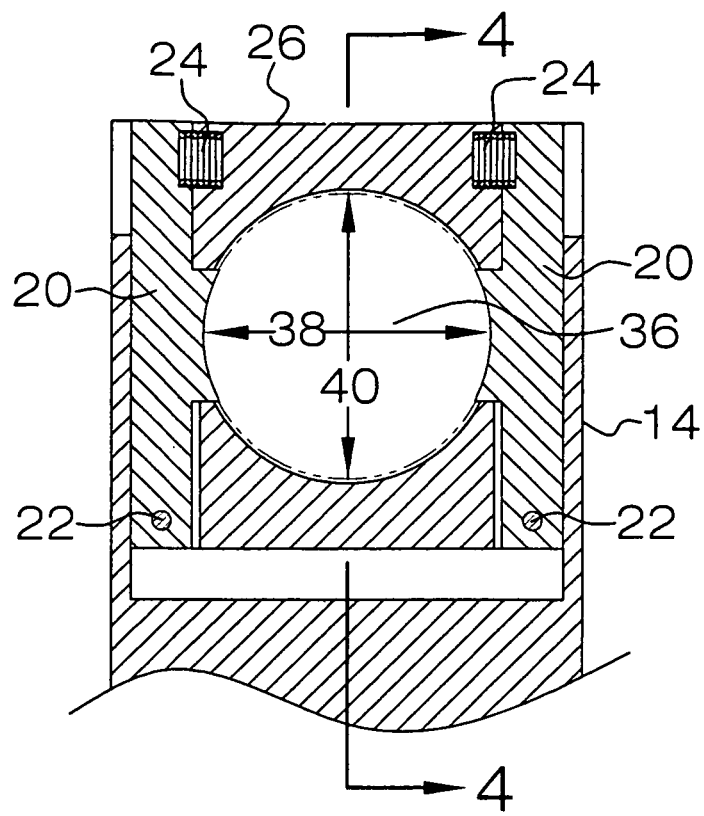
FIG. 2 is a cross-sectional view taken along lines 2-2 of FIG. 1 in an active position of a detachable bolt mate of the present invention.
Figure 3:
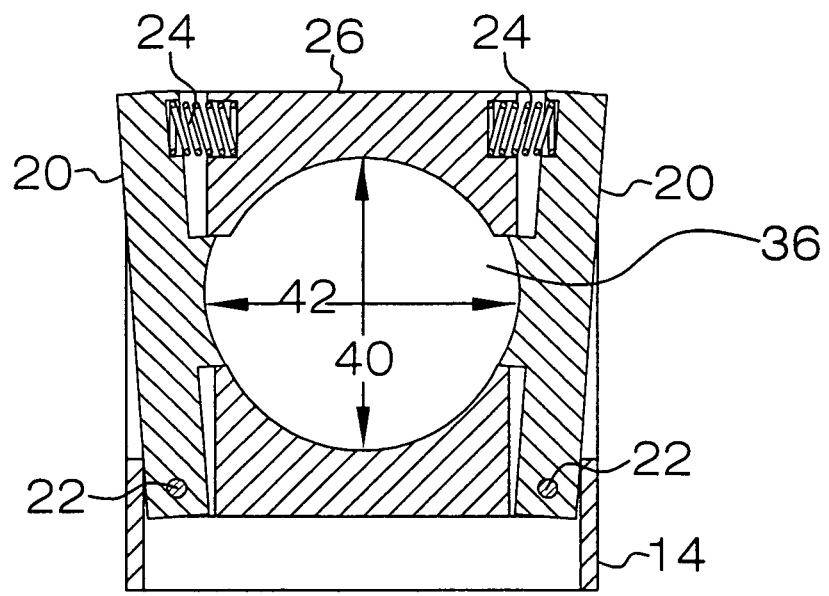
FIG. 3 is a cross-sectional view taken along lines 2-2 of FIG. 1 in an home position of a detachable bolt mate of the present invention.
Figure 4:
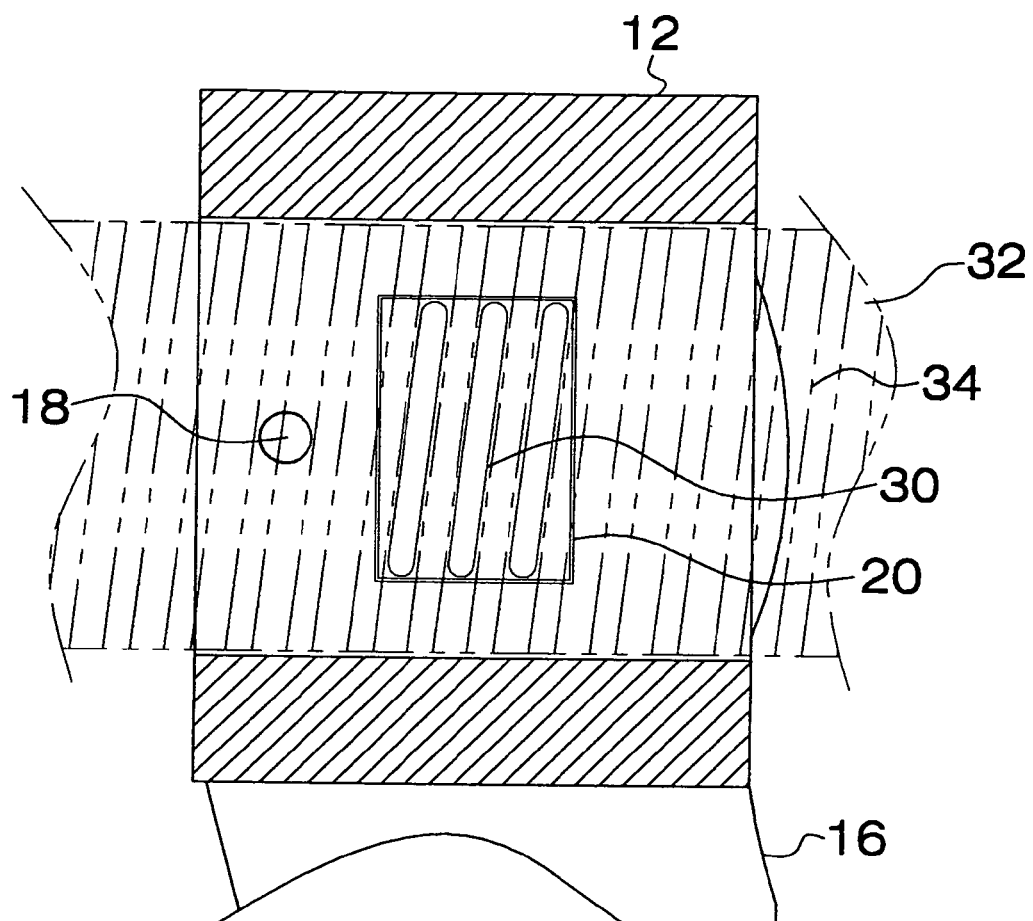
FIG. 4 is a cross-sectional view taken along lines 4-4 of FIG. 2.

The lever 14 is made with two lugs 28. The bolt grips 20 are made with thread 30 on their surfaces facing a bolt 32, which has thread 34 matching thread 30. A hole 36 in the nut 12 is shown in FIG. 2 with its horizontal diameter 38 corresponding to the diameter of the bolt 32, whereas a vertical diameter 40 of the hole 36 is larger than the diameter of the bolt 20.

In operation, a user would slide the device 10 into position around the bolt 32, with the lever and its handle in a horizontal home position 14' and 16' thereof shown in FIG. 1 with dashed lines. When the device reaches the surface required for fastening, say to bolt together two pieces 42 of material, the handle and lever would be pivoted completely downward in one motion into its active position designated by numerals 14 and 16. This would tighten the device around the bolt with great force.

Specifically, in the home position, the lugs 28' of the lever 14 do not engage the bolt grips 20. The grips, which are spring-biased by springs 24, open up and assume the position shown in FIG. 3 where a horizontal diameter 42 of the hole 36 is larger than the diameter of the bolt 32. Therefore, the device 10 can be freely put on the bolt 32. After it has been moved up along the bolt to the point where fastening is to take place, for example, to clamp and hold together twp pieces 40 of material shown in FIG. 1 with dashed lines, the lever 14' is pivoted by the user by the handle 16' downward (in accordance with FIG. 1), for the lever and handle to assume positions designated as 14 and 16, respectively. In this active position, the lugs 28 engage the bolt grips 20 and, overcoming the resistance of the springs 24, press the bolt grips 20 to the bolt 32, and thread 30 on the bolt grip 20 finds thread 34 on the bolt 32 to provide a secure screw joint. The active position of the lever will securely anchor the nut device to the bolt without actual threading action or use of tools.

The wrenchless nut device according to the present invention can be used in a wide range of applications where do-it-yourselfers and professional mechanics must replace nuts, bolts, and other fasteners. This can include extensive use in the automobile field, as well as construction, woodworking, agriculture by hobbyists and industrial machinery repairers.

The appealing features of the wrenchless nut device of the present invention are its ease of use and convenience. Instead of struggling to turn a threaded nut onto a bolt, it can simply clamp into position using a cam lever. This can save a considerable amount of time and effort, thereby enabling repairs and maintenance tasks to be performed with greater efficiency.

The wrenchless nut device provides a more reliable and secure connection to the bolt without vibrating loose over time. This would provide an added measure of safety and protection for equipment. In addition, the fastener is reliable, cost-effective, easily adapted to various applications, and operated without tools.

Those skilled in the art can now appreciate from the foregoing description that the broad teachings of the present invention can be implemented in a variety of forms. Therefore, while this invention has been described in connection with a particular example thereof, the true scope of the invention should not be so limited since other modifications will become apparent to the skilled practitioner upon a study of the drawings, specification and claims that follow.

The invention claimed is:

1. A detachable bolt mate comprising a nut, a lever pivotally attached to the nut, and an elongated handle extending from said lever, wherein the nut is made with a hole varying in size and thus is adapted to slip loosely onto the bolt and to tightly embrace the bolt when said elongated handle is pivoted to act upon said lever, wherein the lever is provided with two lugs, and the nut comprises two articulated, threaded and spring-biased bolt grips that are in separate entities from said nut and are adapted to move apart in a home position of the lever, to thereby allow the loose slipping of the nut onto the bolt, and to be pressed on by the lugs in an active position of the lever, whereby the bolt grips engage the bolt with the thread.

2. A detachable bolt mate comprising a nut and a lever pivotally attached to the nut, and an elongated handle extending from said lever, wherein the lever is provided with two lugs, and the nut comprises two articulated, threaded and spring-biased bolt grips that are in separate entities from said nut and are adapted to move apart in a home position of the lever, to thereby allow the loose slipping of the nut onto the bolt, and to be pressed on by the lugs in an active position of the lever, whereby the bolt grips engage the bolt with the thread.

* * * * *